(12) United States Patent
Hayes et al.

(10) Patent No.: US 8,371,415 B2
(45) Date of Patent: Feb. 12, 2013

(54) SINGLE REDUCTION CARRIER FOR INDEPENDENT SUSPENSION

(75) Inventors: Brian David Hayes, Newark, OH (US); Robert James Martin, III, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 542 days.

(21) Appl. No.: 12/368,358

(22) Filed: Feb. 10, 2009

(65) Prior Publication Data

US 2009/0211386 A1    Aug. 27, 2009

Related U.S. Application Data

(60) Provisional application No. 61/030,602, filed on Feb. 22, 2008.

(51) Int. Cl.
*B60K 17/16* (2006.01)
*B60G 9/00* (2006.01)

(52) U.S. Cl. ............ 180/375; 74/424; 280/124.156; 475/230

(58) Field of Classification Search .......... 74/424, 74/606 R; 180/374, 375, 376; 280/124.11, 280/124.156; 384/583; 475/222, 230, 248
See application file for complete search history.

(56) References Cited

U.S. PATENT DOCUMENTS

| | | | | |
|---|---|---|---|---|
| 1,886,924 A * | 11/1932 | Van Ranst | ............. | 180/353 |
| 2,047,336 A * | 7/1936 | Stout | ............. | 180/62 |
| 2,942,893 A * | 6/1960 | Nallinger | ............. | 280/124.111 |
| 2,978,054 A * | 4/1961 | Kraus | ............. | 180/364 |
| 3,213,700 A * | 10/1965 | Brownyer | ............. | 74/424 |
| 3,231,040 A * | 1/1966 | Blanchette | ............. | 280/86.75 |
| 3,333,866 A * | 8/1967 | Cuskie | ............. | 280/124.116 |
| 3,401,763 A * | 9/1968 | Rolt | ............. | 180/249 |
| 3,403,746 A * | 10/1968 | Fox et al. | ............. | 180/376 |
| 3,497,235 A * | 2/1970 | Peer | ............. | 280/124.156 |
| 3,872,741 A * | 3/1975 | Berchtold et al. | ............. | 475/246 |
| 4,462,272 A | 7/1984 | Roper | | |
| 4,630,699 A * | 12/1986 | Yamada et al. | ............. | 180/375 |
| 4,651,587 A * | 3/1987 | Anderson et al. | ............. | 74/459.5 |
| 4,699,235 A * | 10/1987 | Anderson | ............. | 180/247 |
| 4,705,128 A * | 11/1987 | Krude | ............. | 180/348 |
| 5,070,745 A * | 12/1991 | Lindsey et al. | ............. | 74/665 GB |
| 5,162,026 A * | 11/1992 | Krisher | ............. | 475/248 |
| 5,515,940 A * | 5/1996 | Shichinohe et al. | ............. | 180/376 |
| 5,624,345 A * | 4/1997 | Graft et al. | ............. | 475/230 |
| 5,673,777 A * | 10/1997 | Ziech | ............. | 192/109 R |
| 5,791,205 A | 8/1998 | Ruppert, Jr. | | |
| 5,806,371 A * | 9/1998 | Hibbler et al. | ............. | 74/409 |
| 6,093,127 A * | 7/2000 | DiDomenico et al. | ............. | 475/230 |
| 6,139,461 A | 10/2000 | Eschenburg | | |
| 6,200,241 B1 | 3/2001 | Pinotti et al. | | |
| 6,227,716 B1 * | 5/2001 | Irwin | ............. | 384/583 |
| 6,283,884 B1 | 9/2001 | El-Kassouf | | |
| 6,398,689 B1 * | 6/2002 | Morse et al. | ............. | 475/230 |

(Continued)

FOREIGN PATENT DOCUMENTS

JP    59144856 A * 8/1984

*Primary Examiner* — Paul N Dickson
*Assistant Examiner* — Laura Freedman
(74) *Attorney, Agent, or Firm* — Carlson, Gaskey & Olds, PC

(57) ABSTRACT

A drive unit for an independent suspension includes a single reduction carrier with an offset pinion configuration. The single reduction carrier includes a pinion input gear defining a pinion gear axis of rotation. The pinion gear drives a ring gear, which is coupled to a differential. The differential is laterally positioned to be centered along a longitudinally extending vehicle centerline and the pinion gear axis of rotation is significantly offset from the longitudinally extending vehicle centerline in a lateral direction.

21 Claims, 6 Drawing Sheets

U.S. PATENT DOCUMENTS

| | | | |
|---|---|---|---|
| 6,474,873 B1 * | 11/2002 | Krisher et al. | 384/563 |
| 6,508,734 B2 | 1/2003 | El-Kassouf | |
| 6,540,640 B2 * | 4/2003 | Hibbler et al. | 475/230 |
| 6,569,053 B2 | 5/2003 | Hirao et al. | |
| 6,705,965 B2 | 3/2004 | Sullivan | |
| 6,949,046 B2 | 9/2005 | Bell | |
| 7,108,428 B2 * | 9/2006 | Ason et al. | 384/583 |
| 7,175,560 B2 * | 2/2007 | Petruska et al. | 475/230 |
| 7,393,141 B2 * | 7/2008 | Fahrni et al. | 384/583 |
| 7,485,065 B2 * | 2/2009 | Kearney | 475/230 |
| 7,559,403 B2 * | 7/2009 | Schmitz | 180/344 |
| 7,794,153 B2 * | 9/2010 | Szczepanski et al. | 384/583 |
| 7,866,433 B2 * | 1/2011 | Martin et al. | 180/337 |
| 2002/0198075 A1 * | 12/2002 | Prucher | 475/230 |
| 2008/0188343 A1 | 8/2008 | Pan et al. | |
| 2009/0029821 A1 | 1/2009 | Martin, III et al. | |

\* cited by examiner

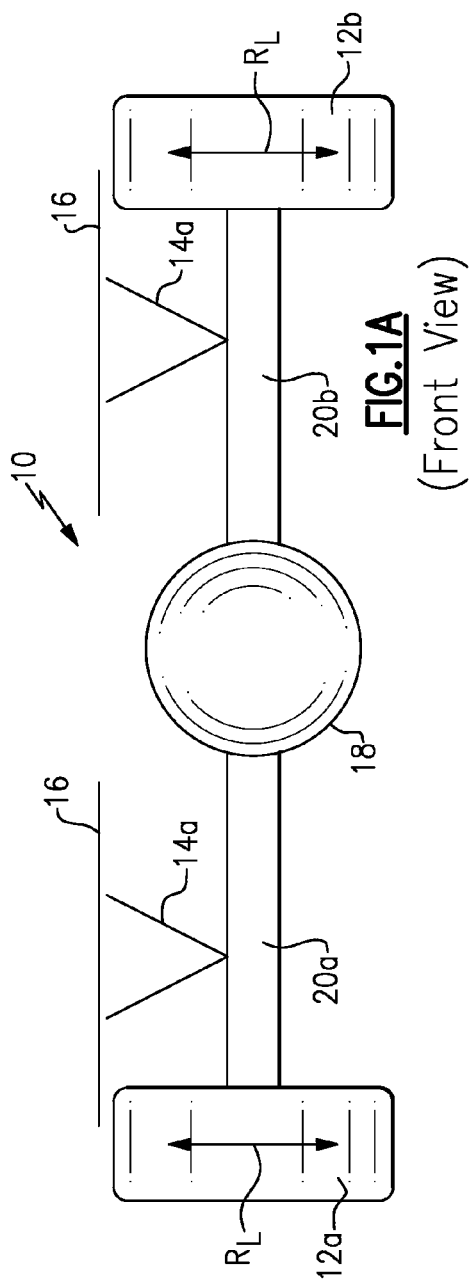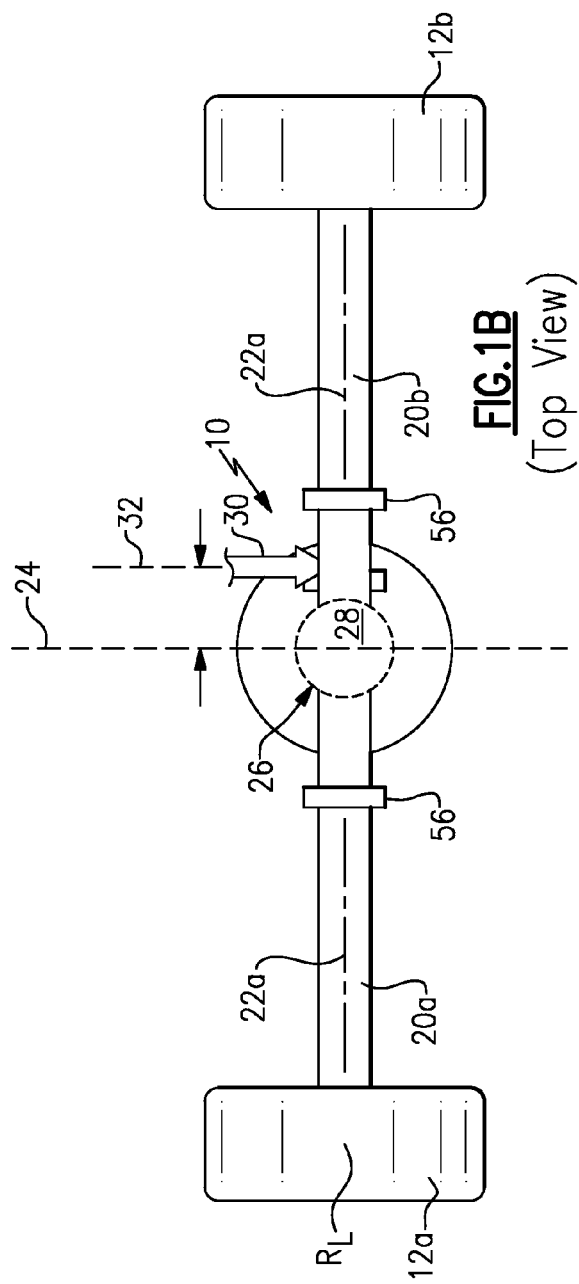

SINGLE REDUCTION CARRIER FOR INDEPENDENT SUSPENSION

RELATED APPLICATION

This application claims priority to U.S. Provisional Application No. 61/030,602, which was filed Feb. 22, 2008.

TECHNICAL FIELD

This invention generally relates to a single reduction carrier for an independent suspension that has a large offset pinion configuration.

BACKGROUND OF THE INVENTION

Traditionally, independent suspensions utilize a single reduction carrier with a pinion input that is aligned very close to a vehicle centerline. The carrier includes an input pinion and ring gear that provide driving input to a differential, which in turn drives a pair of output shafts. Each output shaft is associated with one of a pair of laterally opposed wheels. When used with an independent suspension, each wheel is supported by an independent suspension unit such that the output shaft and associated wheel structure at one wheel can move independently of the output shaft and associated wheel structure at the other wheel.

Extreme drive pinion offsets for carriers used with independent suspensions require a double reduction carrier configuration. This is due to the conflict between requirements that the output shafts be located as close as possible to the vehicle centerline to provide a specified amount of suspension travel, as well as that proper driveline angles be maintained. It is disadvantageous to use double reduction carriers due to the increased weight and cost associated with the additional components, such as helical gears, bearings, case portions, etc. Thus, there is a need for a single reduction carrier for an independent suspension that can accommodate large pinion offsets.

SUMMARY OF THE INVENTION

A drive unit for an independent suspension includes a single reduction carrier with an offset pinion configuration. The single reduction carrier includes a differential that is to be generally centered along a longitudinally extending vehicle centerline in combination with an input pinion axis that is significantly offset from the longitudinally extending vehicle centerline in a lateral direction.

In one example, the single reduction carrier includes a pinion gear that rotates about the input pinion axis. The input pinion axis extends in a longitudinal direction and is laterally offset from intersecting a packaging envelope defined by the differential. The differential drives first and second output shafts, which respectively drive first and second wheel components. The first and second wheel components are independently suspended relative to each other, which allows the first and second wheel components to move independently relative to each other in response to road load inputs.

The differential includes a differential gear assembly that is housed within a differential case. In one example, the single reduction carrier includes a first case portion and a second case portion that are secured to each other to enclose the differential case. An adjuster is associated with one of the first and second case portions to set a desired differential bearing preload.

In one example, the adjuster includes an annular member with a threaded portion and a toothed portion. The threaded portion is threaded on to one of the first and second case portions until the desired differential bearing preload is achieved, and then a lock member engages the toothed portion to lock the adjuster in place.

One example method of assembling the single reduction carrier for the independent suspension includes the steps of installing a first output shaft into a first case portion, installing a pinion assembly, installing a differential assembly onto the first output shaft, installing a second case portion over the differential assembly, and installing a sub-assembly including a second output shaft with an adjuster into the differential assembly and second case portion.

These and other features of the present invention can be best understood from the following specification and drawings, the following of which is a brief description.

BRIEF DESCRIPTION OF THE DRAWINGS

FIG. 1A is a highly schematic front view of a single reduction carrier and independent suspension assembly.

FIG. 1B is a top view of FIG. 1A.

DETAILED DESCRIPTION OF THE PREFERRED EMBODIMENT

Figure 2:
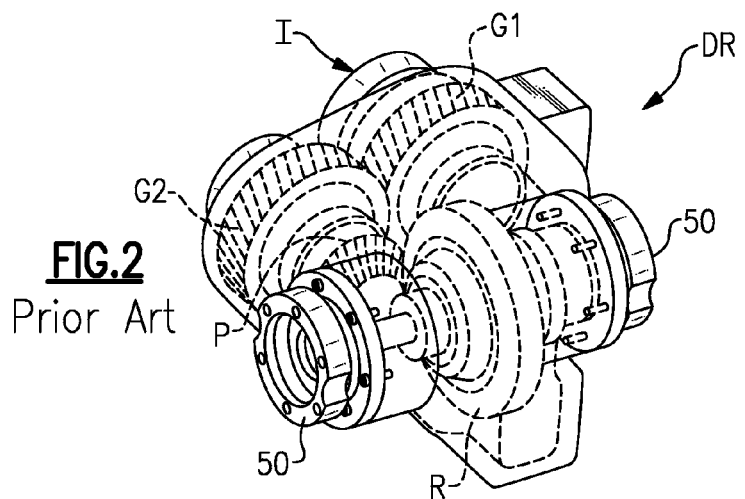
FIG. 2 is a perspective view of a double reduction carrier as used in the prior art.

FIGS. 1A and 1B schematically show a drive unit 10 for driving laterally opposed first 12a and second 12b wheels. Independent suspensions 14a, 14b are used to independently suspend the first 12a and second 12b wheels from a vehicle structure 16 such that the wheels can move independently of each other in response to road load inputs $R_L$. Any type of independent suspension could be used to suspend the wheels from the vehicle structure.

The drive unit 10 includes a single reduction carrier 18 that drives first 20a and second 20b wheel shafts. The first 20a and second 20b wheel shafts define first 22a and second 22b lateral axes of rotation and drive the first 12a and second 12b wheels. When the vehicle is stationary and sitting on level ground, the first 22a and second 22b lateral axes are generally coaxial; however, during vehicle operation these axes can move relative to each other as a result of being independently suspended.

The single reduction carrier 18 is located along a longitudinally extending vehicle centerline 24 that is perpendicular to the lateral direction defined by the first 22a and second 22b lateral axes. The single reduction carrier 18 includes a differential 26 that includes a plurality of differential gears 28. The differential 26 allows the first 20a and second 20b wheel shafts to rotate at different speeds from each other as needed, such as to accommodate turning maneuvers, for example.

A pinion input 30 provides driving input into the single reduction carrier 18. The pinion input 30 defines a longitudinal pinion axis 32 that is offset from the vehicle centerline 24 by a significant amount as shown in FIG. 1B. The differential 26 is generally centered along the longitudinally extending vehicle centerline 24 with the pinion axis 32 being laterally offset from intersecting with the differential 26. In one example, the longitudinal pinion axis 32 is laterally offset from intersecting a packaging envelope defined by the plurality of differential gears 28. In one example, the longitudinal pinion axis 32 is laterally offset from the vehicle centerline 24 within a range of three inches or greater.

FIG. 2 shows a prior art example of a double reduction carrier DR that has traditionally been utilized to accommodate this significant amount of offset. The double reduction carrier DR includes an input I to a first gear G1. The first gear G1 drives a second gear G2 which is laterally spaced from the first gear G1, i.e. rotational axes of the first G1 and second G2 gears are offset from each other. A pinion gear P is coaxial with the second gear G2 and drives a ring gear R. The ring gear R drives laterally opposed shaft outputs SO.

Figure 3A:
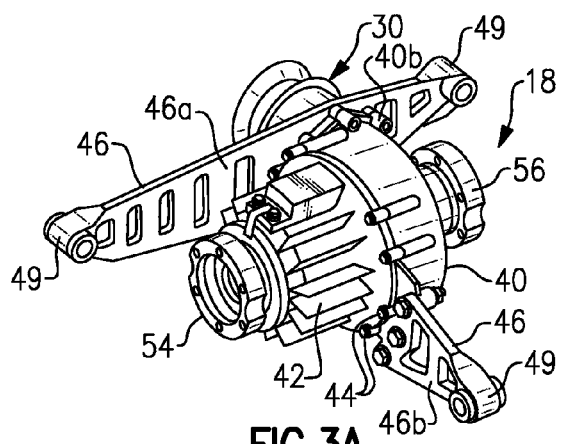
FIG. 3A is a perspective view of the single reduction carrier in an assembled condition with mounting brackets.
Figure 3B:
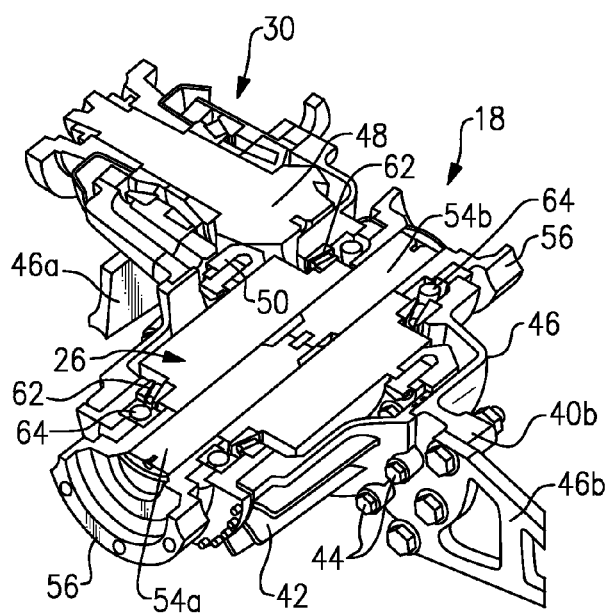
FIG. 3B is a cross-sectional view of FIG. 3A taken in a longitudinal direction and viewed from the top.

FIGS. 3A-3B show this same amount of offset with the subject single reduction carrier 18. In this configuration, the single reduction carrier 18 includes a first case portion or backbone case 40 and a second case portion or lateral case 42 that are attached to each other with a plurality of fasteners 44. The pinion input 30 is offset in a laterally outward direction from the backbone case 40. Mounting brackets 46 are used to secure the single reduction carrier 18 and associated pinion input 30 to the vehicle structure 16.

The mounting brackets 46 comprise a lateral bracket 46a having a generally flat plate body that extends in a lateral direction and a longitudinal bracket 46b having a generally flat plate body that extends in a longitudinal direction. The backbone case 40 includes a first mount portion 40a that is secured to the lateral bracket 46a and a second mount portion 40b that is secured to the longitudinal bracket 46b. The first 40a and second 40b mount portions are positioned on opposing longitudinal sides of the single reduction carrier 18 such that the first 40a and second 40b mount portions are independent of each other. These mounting brackets 46 comprise the sole attachment interface for the single reduction carrier 18 to the vehicle structure 16.

Figure 4:
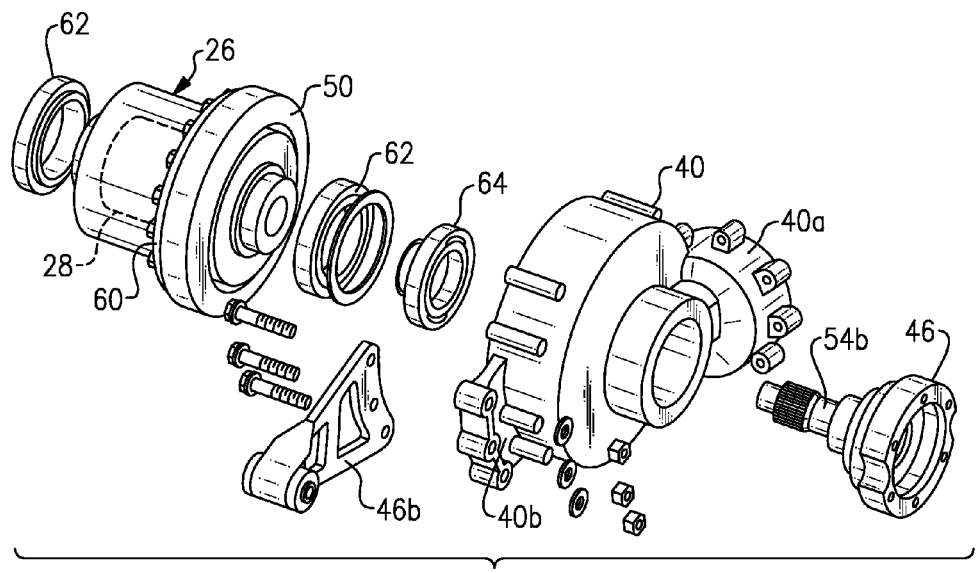
FIG. 4 is an exploded view of a portion of the single reduction carrier that includes one case portion, one output shaft, and a differential.

The pinion input 30 includes a pinion gear 48 that meshes with a ring gear 50. In the example shown, spiral bevel gearing is used; however, hypoid gearing could also be used. In a hypoid gearing configuration a pinion centerline would be vertically offset relative to a differential centerline. As shown in FIG. 3B, the ring gear 50 in the present configuration is secured to a portion of the differential 26 at a bolted joint. The differential 26 is schematically shown in the figures; however, it should be understood that the differential 26 comprises the well known structure of a differential case 60 (FIG. 4) that supports and houses the plurality of differential gears 28 on a spider. The ring gear 50 is bolted to the differential case 60 as known. The backbone 40 and lateral 42 cases house the differential case 60 as shown in FIG. 4. The differential gears 28 are configured to drive first 54a and second 54b output shafts that are enclosed within the backbone 40 and lateral 42 cases.

The first 54a and second 54b output shafts are coupled to the first 20a and second 20b wheel shafts, respectively, at flanges 56.

FIG. 4 shows an exploded view of the differential 26. The ring gear 50 is bolted to an outer flange of the differential case 60 that encloses the plurality of differential gears 28. The differential case 60 can be comprised of one or more case portions. Typically, the differential case 60 is comprised of first and second differential case halves. The differential 26 also includes a pair of differential bearings 62. One differential bearing is associated with the backbone case 40 and the other is associated with the lateral case 42. A shaft bearing 64 supports the second output shaft 54b and is installed within the backbone case 40. Another shaft bearing 64 supports the first input shaft 54a and is installed within the lateral case 42 (FIG. 3B).

Figure 5:
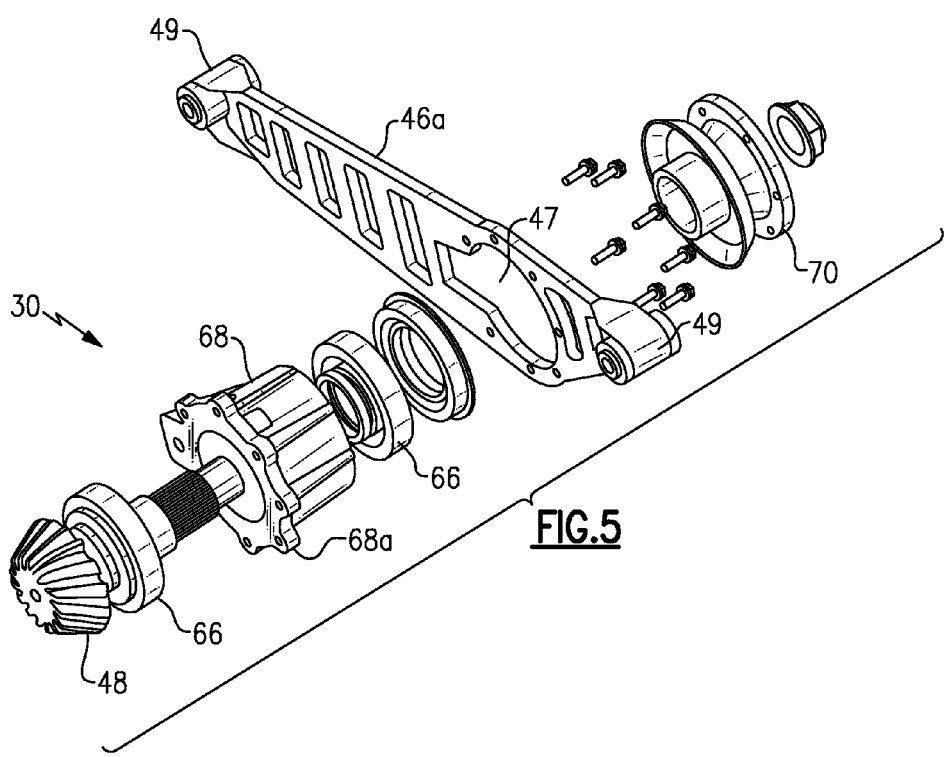
FIG. 5 is an exploded view of a portion of the single reduction carrier that includes a pinion input assembly and a mounting bracket.

FIG. 5 shows an exploded view of the pinion input 30. The pinion input 30 includes the pinion gear 48, pinion bearings 66, and a pinion cage 68. A flange connection 70 is used to connect the pinion gear 48 to driving input from a driveshaft (not shown). The driveshaft is coupled to a power source such as an engine or electric motor, for example. The mounting bracket 46 and associated mounting structure is used to support the pinion input 30 on the vehicle structure 16.

The lateral bracket 46a has a center opening 47 that surrounds the pinion cage 68. The pinion cage 68 comprises a cup-shaped body that includes a mounting flange portion 68a at one end that is secured to the lateral bracket 46a. Pivot mounts 49 are positioned at each end of the lateral bracket 46a for securement to the vehicle structure 16. The longitudinal bracket 46b also includes a pivot mount 49 that is secured to the vehicle structure (FIG. 3B). As discussed above, these mounting brackets 46a, 46b provide the sole attachment of the single reduction carrier 18 to the vehicle structure 16.

Figure 6:
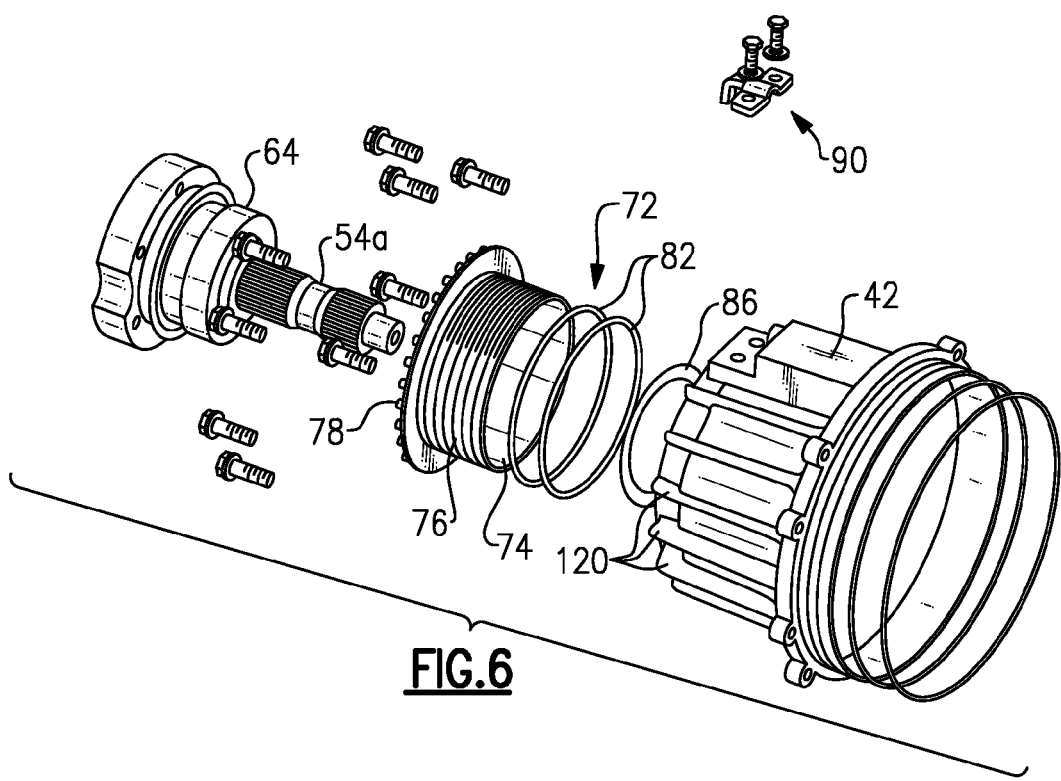
FIG. 6 is an exploded view of a portion of the single reduction carrier that includes another case portion, another output shaft, and an adjuster.
Figure 7:
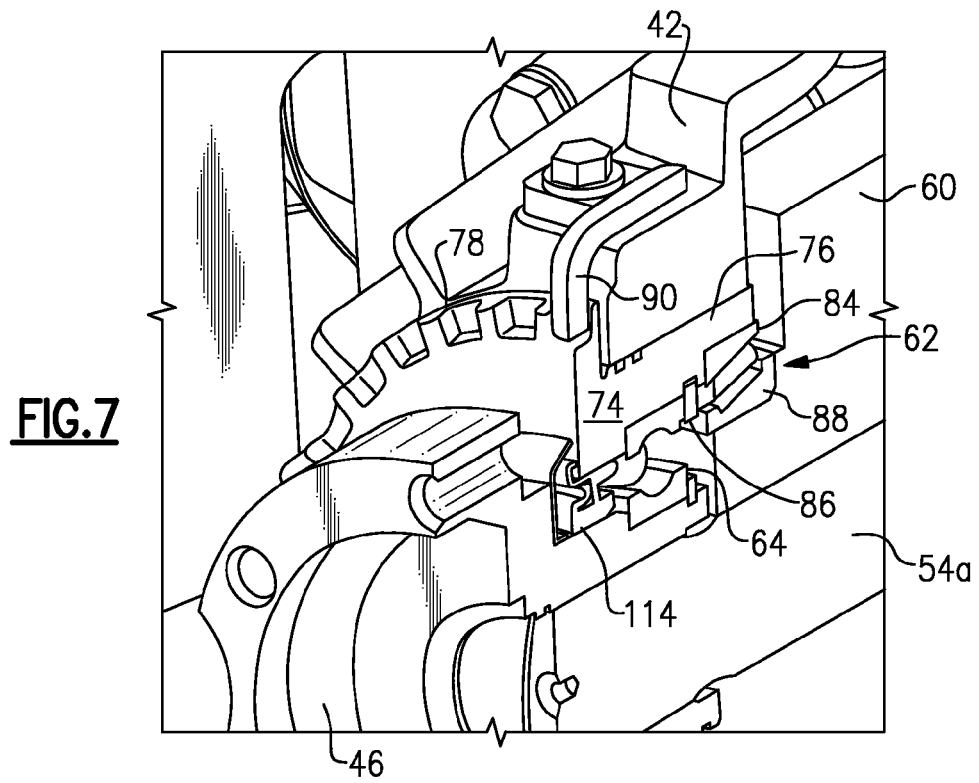
FIG. 7 is a magnified cross-sectional view of the adjuster.

FIGS. 6 and 7 show the lateral case 42 and an adjuster assembly 72. The adjuster assembly 72 comprises an annular member 74 having a threaded outer portion 76 that is threadably engaged within an opening in the lateral case 42 and a toothed portion 78. The adjuster assembly 72 is associated with the first output shaft 54a and the respective shaft bearing 64. O-ring seals 82 are also installed within the annular member 74 for sealing purposes. The annular member 74 carries a cup 84 of the associated differential bearing 62. A snap ring 86 holds shaft bearing 64 on the annular member 74. A cone 88 of this differential bearing 62 is installed on the differential case 60. During installation of the adjuster assembly 72, the annular member 74 with the cup 84 is threaded into the lateral case 42 and adjusted until the differential bearing 62 is in the desired position. Once final adjustment is performed, a lock tab 90 is installed to engage the toothed portion 78, which locks the adjuster assembly 72 in place.

Figure 8:
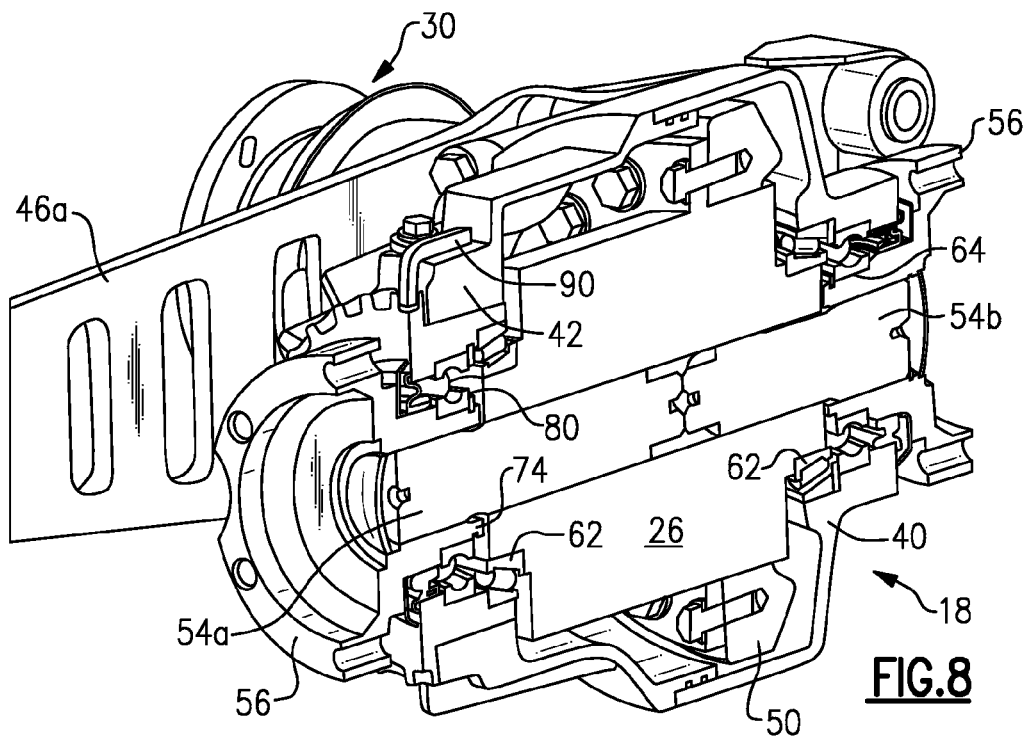
FIG. 8 is a cross-sectional view of FIG. 3A taken in a longitudinal direction and viewed from the front.
Figure 9:
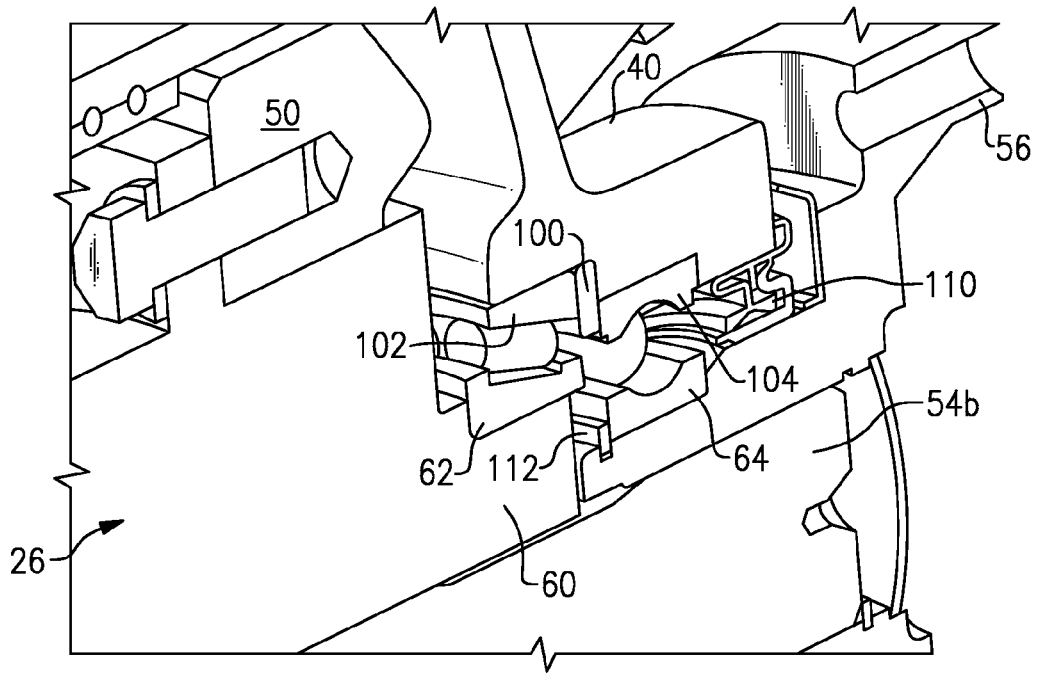
FIG. 9 is a magnified view of an annular ring used to set tooth contact for a pinion and ring gear of the pinion input assembly.

FIG. 8 shows a cross-sectional view of the differential 26 and backbone 40 and lateral 42 cases. FIG. 9 shows an enlarged view of an interface between the backbone case 40 and the differential bearing 62 and shaft bearing 64 associated with the second output shaft 54b. The differential bearing 62 is positioned radially between the differential case 60 and the backbone case 40. An annular ring 100 is inserted between a cup 102 of the differential bearing 62 and an outer race 104 of the shaft bearing 64. The annular ring 100 is used to set the tooth contact for the pinion gear 48 and ring gear 50. The annular ring 100 fixes the outer race 104 of the shaft bearing 64 in place, and the thickness of the annular ring 100 can be varied to provide the proper position for the ring gear 50 relative to the pinion gear 48. A thicker annular ring 100 moves the ring gear 50 further away from the pinion gear 48 while a thinner annular ring 100 would move the ring gear 50 closer.

Figure 10:
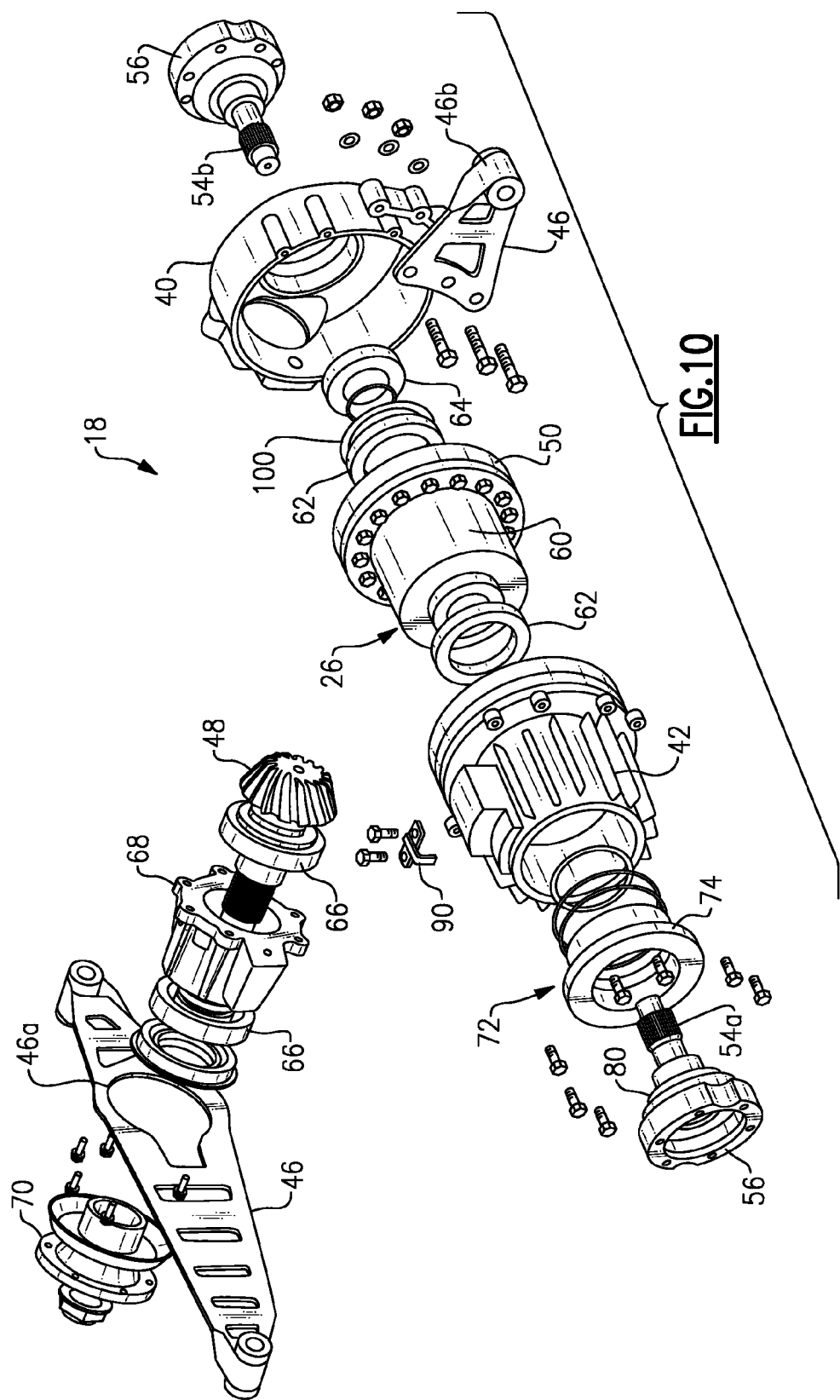
FIG. 10 is an exploded view of the assembly set forth in FIG. 3A.

FIG. 10 shows an exploded view of the entire assembly of the single reduction carrier 18. One example of an assembly sequence for the single reduction carrier 18 comprises assembling the second output shaft 54*b* into the backbone case 40. This would include installing the shaft bearing 64 into the backbone case 40 and installing a seal 110 (FIG. 9) into the backbone case 40. The second output shaft 54*b* is then inserted into the backbone case 40 and retained with a snap ring 112 (FIG. 9).

Next, the pinion gear 48 is installed into the pinion cage 68, which would be installed in a conventional manner. The backbone case 40 includes an opening through which the pinion gear 48 can be inserted. The pinion cage 68 can then be secured to the backbone case at the mounting flange portion 68*a*.

Next, the differential 26 with the ring gear 50 is installed onto the second output shaft 54*b*. Tooling can be used to hold the differential 26 in place while tooth contacts are set with spacer selection.

Next, the lateral case 42 is installed over the differential 26. Differential anti-rotation dogs engage in slots on the lateral case 42, as required by some differential designs.

Next, the adjuster assembly 72 and first output shaft 54*a* are installed into the differential 26 and lateral case 42. A sub-assembly comprising the first output shaft 54*a*, a seal 114 (FIG. 7), shaft bearing 64, annular member 74, and differential bearing cup 84 is installed into the lateral case 42 via the threaded outer portion 76 of the annular member 74. The position of the annular member 74 is adjusted until the proper bearing preload is set and then the lock tab 90 is then installed. The lock tab 90 engages the toothed portion 78 of the annular member 74 to lock the adjuster assembly 72 in place once the desired preload and bearing position is achieved.

The single reduction carrier 18 as used with an independent suspension configuration provides several advantages. As discussed above, this configuration can be used in extreme pinion offset configurations. Further, this configuration utilizes current output shafts and bearings, which is advantageous from a cost perspective. The bolt-on pinion cage 68 also can be used as a front mounting point for bracket 46.

In one example, the backbone case 40 is made from ductile iron as opposed to cast aluminum which has only 30% margin in strength/weight ratio. Ductile iron is a low-risk, low cost material. The backbone case 40 is configured such that all aluminum components can be attached via ductile iron tapped holes, which means standard fasteners can be used. Further, the configuration has eliminated the traditional output shaft bolt-on flange.

In one example, the pinion cage 68 and lateral case 42 are made from aluminum, which provides a weight savings. The lateral case 42 includes a plurality of fins 120 (FIG. 6), which improves internal heat transfer from the carrier to ambient by convection. Further, no cores for the lateral case are needed as there are no mounting arrangements needed for the lateral case 42.

In the subject configuration, the differential bearings 62 are widely spread from each other, which improves loading. In one example, thinner bearings with a large diameter are used. Assembly is further facilitated due to the elimination of leg caps for the differential bearings 62.

The differential bearings are preloaded as described above, and can be adjusted by 0.07 mm increments, which provides for precise preload settings.

The cases are sealed with o-rings, which maximizes ring gear diameter by not requiring bolt bosses high and low.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A drive unit for driving a pair of laterally opposed vehicle wheels comprising:
    a single reduction carrier having a pinion input that is to be significantly offset from a vehicle centerline and a ring gear driven by said pinion input, and wherein said single reduction carrier includes a differential that is attached to said ring gear such that said ring gear is offset from a center of said differential, and wherein said differential includes a differential gear assembly and wherein said pinion input defines a longitudinal pinion axis of rotation that is laterally offset from intersecting a packaging envelope defined by said differential gear assembly;
    a first output shaft driven by said single reduction carrier and a second output shaft driven by said single reduction carrier, said first output shaft to drive a first wheel component and said second output shaft to drive a second wheel component laterally opposite from said first wheel component; and
    a first independent suspension associated with said first wheel component and a second independent suspension associated with said second wheel component, said first and said second independent suspensions allowing said first and said second wheel components to move independently relative to each other in response to road load inputs.

2. The drive unit according to claim 1 wherein said single reduction carrier is to be generally aligned with the vehicle centerline, and wherein said pinion input defines a pinion axis of rotation that is generally parallel to the vehicle centerline and which is offset from the vehicle centerline by at least three inches.

3. The drive unit according to claim 1 wherein said center of said differential is defined as an axis extending between opposing end faces of said first and second output shafts, and wherein said pinion input comprises a pinion gear having pinion gear teeth that are in meshing engagement with ring gear teeth of said ring gear, and wherein said ring gear teeth are positioned to engage said pinion gear teeth such that the entire ring gear is offset from intersecting said axis.

4. The drive unit according to claim 1 wherein said differential includes a differential gear assembly enclosed by a differential case, and wherein said center of the differential is defined as an axis extending through a center of said differential gear assembly, and wherein said ring gear has a thickness extending from one lateral side to an opposite lateral side, and wherein the entire thickness of said ring gear is offset from intersecting said axis.

5. A drive unit for driving a pair of laterally opposed vehicle wheels comprising:
    a single reduction carrier having a pinion input that is to be significantly offset from a vehicle centerline and a ring gear driven by said pinion input, and wherein said single reduction carrier includes a differential that is attached to said ring gear such that said ring gear is offset from a center of said differential;
    a first output shaft driven by said single reduction carrier and a second output shaft driven by said single reduction carrier said first output shaft to drive a first wheel component and said second output shaft to drive a second wheel component laterally opposite from said first wheel component;

an adjuster assembly comprising an adjuster ring, a differential bearing component supported by said adjuster ring, and an output shaft bearing supported on one of said first and said second output shafts, said adjuster assembly assembled to said one of said first and said second output shafts to form a sub-assembly, and wherein said sub-assembly is assembled as a unit into a case component of said single reduction carrier; and a first independent suspension associated with said first wheel component and a second independent suspension associated with said second wheel component, said first and said second independent suspensions allowing said first and said second wheel components to move independently relative to each other in response to road load inputs.

6. A drive unit for driving a pair of laterally opposed vehicle wheels comprising:

a single reduction carrier having a pinion input that is to be significantly offset from a vehicle centerline and a ring gear driven by said pinion input, and wherein said single reduction carrier includes a differential that is attached to said ring gear such that said ring gear is offset from a center of said differential;

a first output shaft driven by said single reduction carrier and a second output shaft driven by said single reduction carrier, said first output shaft to drive a first wheel component and said second output shaft to drive a second wheel component laterally opposite from said first wheel component;

wherein said single reduction carrier includes a first case portion and a second case portion that cooperate to enclose said differential, and including an annular ring supported by one of said first and second case portions and positioned between a differential bearing component and an output shaft bearing component; and a first independent suspension associated with said first wheel component and a second independent suspension associated with said second wheel component, said first and said second independent suspensions allowing said first and said second wheel components to move independently relative to each other in response to road load inputs.

7. A drive unit for driving a pair of laterally opposed vehicle wheels comprising:

a single reduction carrier having a pinion input that is to be significantly offset from a vehicle centerline, and wherein said single reduction carrier includes a backbone case portion and a lateral case portion that are attached to each other at a first mount interface to enclose a differential assembly, and wherein said backbone case portion includes a lateral mount portion and a longitudinal mount portion to secure said single reduction carrier to a vehicle structure;

a first output shaft driven by said single reduction carrier and a second output shaft driven by said single reduction carrier, said first output shaft to drive a first wheel component and said second output shaft to drive a second wheel component laterally opposite from said first wheel component; and a first independent suspension associated with said first wheel component and a second independent suspension associated with said second wheel component, said first and said second independent suspensions allowing said first and said second wheel components to move independently relative to each other in response to road load inputs.

8. The drive unit according to claim 7 including a lateral mounting bracket secured to said lateral mount portion of said backbone case at a second attachment interface and a longitudinal mounting bracket secured to said longitudinal mount portion of said backbone case portion at a third attachment interface, said second and said third attachment interfaces being located on longitudinally opposite sides of said single reduction carrier from each other.

9. The drive unit according to claim 8 wherein said pinion input includes a pinion gear that defines an input axis of rotation, at least one pinion bearing to support said pinion gear for rotation about said input axis of rotation, and a pinion cage that receives said at least one pinion bearing, said pinion cage including a cage mount portion that is secured to said lateral mounting bracket.

10. A drive unit or driving a pair of laterally opposed vehicle wheels comprising;

a single reduction carrier having a pinion input that is to be significantly offset from a vehicle centerline and a ring gear driven by said pinion input, and wherein said single reduction carrier includes a differential that is attached to said ring gear such that said ring gear is offset from a center of said differential and wherein said differential comprises a differential gear assembly, a differential case that houses said differential gear assembly, and first and second differential bearings;

a first output shaft driven by said single reduction carrier and a second output shaft driven by said single reduction carrier, said first output shaft to drive a first wheel component and said second output shaft to drive a second wheel component laterally opposite from said first wheel component;

an adjuster assembly associated with one of said first and said second output shafts, said adjuster assembly to adjust a position of one of said first and said second differential bearings to achieve a desired bearing position; and a first independent suspension associated with said first wheel component and a second independent suspension associated with said second wheel component, said first and said second independent suspensions allowing said first and said second wheel components to move independently relative to each other in response to road load inputs.

11. The drive unit according to claim 10 wherein said single reduction carrier includes a backbone case portion and a lateral case portion that are attached to enclose said differential case, and wherein one of said first and said second differential bearings is supported within said backbone case portion and the other of said first and said second differential bearings is supported within said lateral case portion, and wherein said adjuster assembly includes an annular member that is threadably attached to said lateral case portion.

12. A drive unit for driving a pair of laterally opposed vehicle wheels comprising:

a single reduction carrier having a pinion input that is to be significantly offset from a vehicle centerline, wherein said single reduction carrier includes a differential comprising a differential gear assembly, a differential case that houses said differential gear assembly, and first and second differential bearings, and wherein said single reduction carrier includes a backbone case portion and a lateral case portion that are attached to enclose said differential case, and wherein one of said first and said second differential bearings is supported within said backbone case portion and the other of said first and said second differential bearings is supported within said lateral case portion;

a first output shaft driven by said single reduction carrier and a second output shaft driven by said single reduction carrier, said first output shaft to drive a first wheel component and said second output shaft to drive a second wheel component laterally opposite from said first wheel component;

an adjuster assembly associated with one of said first and said second output shafts, said adjuster assembly to adjust a position of one of said first and said second differential bearings to achieve a desired bearing position, and wherein said adjuster assembly includes an annular member that is threadably attached to said lateral case portion;

a first independent suspension associated with said first wheel component and a second independent suspension associated with said second wheel component, said first and said second independent suspensions allowing said first and said second wheel components to move independently relative to each other in response to road load inputs; and wherein said pinion input includes a pinion gear that directly drives a ring gear, and including an annular ring installed within said backbone case portion at a position between said one of said first and said second differential bearings and an associated shaft bearing, and wherein a thickness of said annular ring is adjusted to provide a desired tooth contact between said pinion gear and said ring gear.

13. A drive unit for a vehicle with an independent suspension comprising:

a single reduction carrier having a pinion input gear defining a pinion gear axis of rotation, a ring gear directly driven by said pinion input gear, and a differential assembly driven by said ring gear; and wherein said differential assembly is laterally positioned to be centered along a longitudinally extending vehicle centerline, and wherein said pinion gear axis of rotation is significantly offset from said longitudinally extending vehicle centerline in a lateral direction.

14. The drive unit according to claim 13 including a first output shaft driven by said single reduction carrier and a second output shaft driven by said single reduction carrier, said first output shaft to drive a first wheel component and said second output shaft to drive a second wheel component laterally opposite from said first wheel component; and a first independent suspension associated with said first wheel component and a second independent suspension associated with said second wheel component, said first and said second independent suspensions allowing said first and said second wheel components to move independently relative to each other in response to road load inputs.

15. The drive unit according to claim 14 wherein said pinion gear axis of rotation is laterally offset from intersecting a packaging envelope defined by said differential assembly, and said pinion gear axis of rotation is offset from said longitudinally extending vehicle centerline by at least three inches.

16. A method of assembling a single reduction carrier for a vehicle having an independent suspension comprising the steps:

(a) installing a first output shaft into a first case portion;

(b) installing a pinion assembly that includes a pinion gear with pinion gear teeth;

(c) attaching a ring gear to a differential assembly such that the ring gear is offset from a center of the differential assembly, and installing the differential assembly onto the first output shaft;

(d) installing a second case portion over the differential assembly; and (e) installing a sub-assembly including a second output shaft with an adjuster into the differential assembly and second case portion, and wherein the center of the differential assembly is defined as an axis extending between opposing end faces of the first and second output shafts, and wherein step c) further includes positioning ring gear teeth of the ring gear to engage the pinion gear teeth such that the entire ring gear is offset from intersecting the axis, and wherein the differential assembly includes a differential gear assembly positioned within a differential case, and wherein the pinion gear defines a pinion gear axis of rotation and wherein the pinion gear axis of rotation does not intersect the differential gear assembly.

17. A method of assembling a single reduction carrier for a vehicle having an independent suspension comprising the steps:

(a) installing a first output shaft into a first case portion;

(b) installing a pinion assembly;

(c) attaching a ring gear to a differential assembly such that the ring gear is offset from a center of the differential assembly, and installing the differential assembly onto the first output shaft;

(d) installing a second case portion over the differential assembly; and (e) installing a sub-assembly including a second output shaft with an adjuster into the differential assembly and second case portion, and wherein the sub-assembly includes the second output shaft, a shaft seal, a shaft bearing, the adjuster, and a differential bearing component, and including threading the adjuster into engagement with the second case portion to adjust a position of a differential bearing.

18. A method of assembling a single reduction carrier for a vehicle having an independent suspension comprising the steps:

(a) installing a first output shaft into a first case portion by installing a first shaft bearing and a first shaft seal into the first case portion, subsequently inserting the first output shaft into the first case portion, and retaining the first output shaft with a snap ring, (b) installing a pinion assembly;

(c) attaching a ring gear to a differential assembly such that the ring gear is offset from a center of the differential assembly, and installing the differential assembly onto the first output shaft;

(d) installing a second case portion over the differential assembly; and (e) installing a sub-assembly including a second output shaft with an adjuster into the differential assembly and second case portion.

19. The method according to claim 18 wherein step (b) further includes installing a pinion gear into a pinion cage and securing the pinion cage to the first case portion, and wherein step (c) further includes securing a ring gear to the differential assembly and setting a desired tooth contact between the ring gear and the pinion gear.

20. A method of assembling a single reduction carrier for a vehicle having an independent suspension comprising the steps:
(a) installing a first output shaft into a first case portion by installing a first shaft bearing and a first shaft seal into the first case portion, subsequently inserting the first output shaft into the first case portion, and retaining the first output shaft with a snap ring;
(b) installing a pinion assembly by installing a pinion gear into a pinion cage and securing the pinion cage to the first case portion;
(c) installing differential assembly onto the first output shaft, securing a ring gear to the differential assembly, and setting a desired tooth contact between the ring gear and the pinion gear;
(d) installing a second case portion over the differential assembly; and
(e) installing a sub-assembly including a second output shaft with an adjuster into the differential assembly and second case portion, and wherein the adjuster includes an annular member having a threaded outer portion and a toothed portion, and wherein the sub-assembly comprises an assembly of the second output shaft, a shaft seal, a shaft bearing, the annular member, and a differential bearing cup, and wherein step (e) further includes threading the threaded outer portion of the annular member into an internal cavity of the second case portion until a desired bearing preload is set for a differential bearing that includes the differential bearing cup, and engaging a lock member with the toothed portion of the annular member to lock the adjuster in place once the desired bearing preload is set.

21. A drive unit or driving a pair of laterally opposed vehicle wheels comprising:
a single reduction carrier having a pinion input that is to be significantly offset from a vehicle centerline and a ring gear driven by said pinion input, and wherein said single reduction carrier includes a differential that is attached to said ring gear such that said ring gear is offset from a center of said differential, and wherein said differential includes a differential gear assembly enclosed by a differential case, and wherein said center of the differential is defined as an axis extending through a center of said differential gear assembly, and wherein said ring gear has a thickness extending from one lateral side to an opposite lateral side, and wherein the entire thickness of said ring gear is offset from intersecting said axis, and wherein said pinion input comprises a pinion gear in meshing engagement with said ring gear, and wherein said pinion gear defines a pinion gear axis of rotation that does not intersect said differential gear assembly;
a first output shaft driven by said single reduction carrier and a second output shaft driven by said single reduction carrier, said first output shaft to drive a first wheel component and said second output shaft to drive a second wheel component laterally opposite from said first wheel component; and
a first independent suspension associated with said first wheel component and a second independent suspension associated with said second wheel component, said first and said second independent suspensions allowing said first an said second wheel components to move independently relative to each other in response to road load inputs.

* * * * *

UNITED STATES PATENT AND TRADEMARK OFFICE
CERTIFICATE OF CORRECTION

| | | |
|---|---|---|
| PATENT NO. | : 8,371,415 B2 | Page 1 of 1 |
| APPLICATION NO. | : 12/368358 | |
| DATED | : February 12, 2013 | |
| INVENTOR(S) | : Brian David Hayes et al. | |

It is certified that error appears in the above-identified patent and that said Letters Patent is hereby corrected as shown below:

In the Claims

Column 12 (Line 1) Claim 21:

After "A drive unit"
Delete "or" and insert -- for --.

Signed and Sealed this
Twenty-sixth Day of November, 2013

Margaret A. Focarino
*Commissioner for Patents of the United States Patent and Trademark Office*